July 28, 1925.

F. P. KOBERT 1,547,421

ADJUSTABLE SUPPLEMENTAL RIM FOR POWER PULLEYS AND THE LIKE

Original Filed Feb. 6, 1922

INVENTOR
Frank P. Kobert
BY his ATTORNEY
Edward M. Evarts.

Patented July 28, 1925.

1,547,421

UNITED STATES PATENT OFFICE.

FRANK P. KOBERT, OF COUNTY OF WORCESTER, MASSACHUSETTS, ASSIGNOR TO KOBERT SUPPLEMENTARY PULLEY RIM CO., A CORPORATION OF MASSACHUSETTS.

ADJUSTABLE SUPPLEMENTAL RIM FOR POWER PULLEYS AND THE LIKE.

Application filed February 6, 1922, Serial No. 534,568. Renewed April 2, 1924.

*To all whom it may concern:*

Be it known that I, FRANK P. KOBERT, a citizen of the United States, and residing in the county of Worcester and State of Massachusetts, have invented an Improvement in Adjustable Supplemental Rims for Power Pulleys and the like, of which the following is a specification.

My present invention relates to supplemental rims for power pulleys and the like and aims to provide supplemental rims for the purpose designated which are simple in construction, which are convenient for use for enlarging the dimensions of the main power pulleys or belt wheels to which they are intended to be applied, which are so constructed and arranged as to avoid, as far as possible, the duplication of parts, and which are so constructed as to avoid and minimize factory hazards resulting from the use of such supplemental rims.

The present invention is an improvement on the invention described and claimed in my co-pending application filed of even date herewith and entitled "Supplemental rims for power pulleys or belt wheels", which co-pending application is a refiling of application originally bearing Serial No. 279,676, filed February 28, 1919, which was forfeited May 16, 1919, and refiled May 16, 1921, as an application bearing Serial No. 470,204. This latter application in turn describes and claims an improvement over the construction described and claimed in my United States Letters Patent No. 1,062,831, granted May 27, 1913.

In the following specification, I shall describe, and in the accompanying drawings show, one illustrative embodiment of the present invention. It is, however, to be understood that my invention is not limited to the specific embodiment thereof herein shown and described for purposes of illustration only.

Referring to the drawings.

Figure 1:
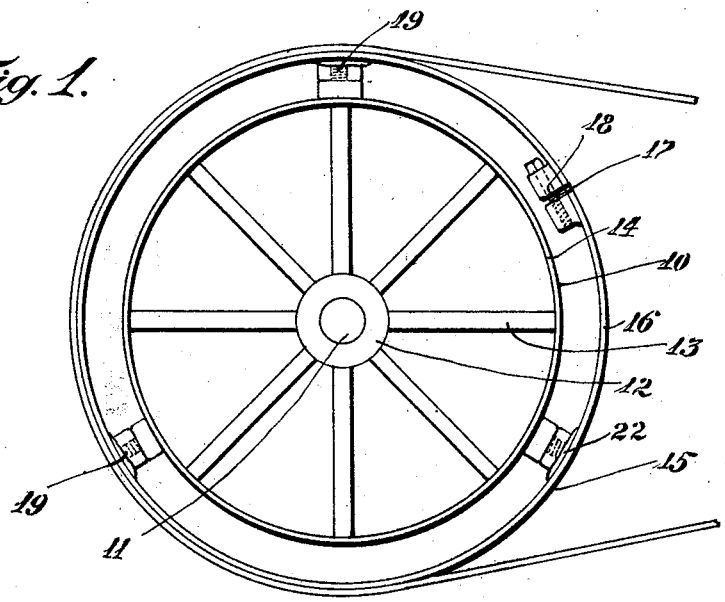
Figure 1 is a side elevation of a made up steel pulley provided with the herein described supplemental rim of the present invention.
Figure 2:
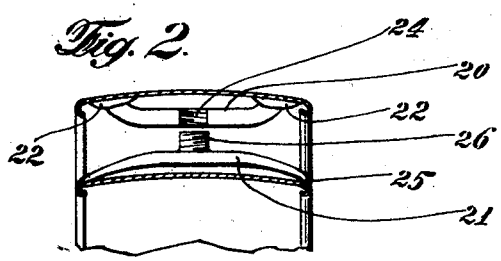
Figure 2 is a detailed cross-sectional view of the supplemental rim with the clamping and retaining members shown in spaced relation before the supplemental rim is assembled for application to the power pulley.

Referring to the drawings, 10 designates the usual steel pulley mounted on a shaft 11 and comprising a hub 12, spokes 13, and the rim 14. These parts are of the usual construction and design and form no part of the present invention.

15 generally designates the supplemental rim of the present embodiment of the invention, this rim comprising a ring-shaped member 16, which is preferably split, as shown at 17, and is provided with any suitable means, generally indicated by reference character 18, for adjustably tensioning the ring-shaped member 16.

The arrangement according to the present invention is such that the supplemental rim may be attached to the power pulley or equivalent device 10 by being brought into binding frictional engagement with the same. For this purpose I interpose between the main rim 14 and the supplemental rim 16 suitable spacing and clamping means, such as a plurality of spacing members 19 for suitably spacing the supplemental rim from the main rim and for enabling the supplemental rim to be brought into frictional clamping engagement with the main rim.

Each of the spacing and clamping members 19, of which three are shown, by way of example, comprises a retaining member 20 and a binding member 21, each pair of members 20 and 21 comprises what may be termed a compound spacing member. Each retaining member 20 is preferably fixedly attached to the inner periphery of the ring-shaped member 16. For this purpose, the ends 22 of the bridge-shaped retaining member 20 are welded or otherwise suitably attached, as at 23, to the inner periphery of the ring-shaped member 16. Each retaining member is also provided, at the central portion thereof, with a suitably threaded opening 24.

Each binding member 21 preferably comprises a bridge-shaped member the outer ends of which are slightly lip-shaped, as indicated at 25, for the purpose of enabling the clamping member to centre and properly position the supplemental rim in place on the main rim. At the central portion thereof, the binding member 21 is provided with a threaded stud 26 for engagement with the threaded opening 24 in the retaining member 20.

It will be noted that the clamping members are removable and may thus be used for applying various supplemental rims of various dimensions to the same or different power pulleys or belt wheels. In order to further adapt these clamping members for use with supplemental rims of varying dimensions, I provide what may be termed supplemental spacing members, generally designated by reference character 27. Each of these supplemental spacing members comprises a threaded stud 30 of the same dimension as the threaded stud 26, so as to be capable of being received and retained by the threaded aperture 24 in the retaining member 20.

Figure 4:
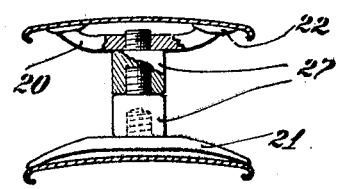
Figure 4 is a similar view showing the supplemental rim assembled on the power pulley with the use of supplementary spacing members.
Figure 3:
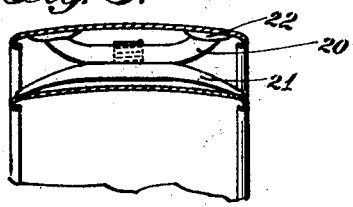
Figure 3 is a view similar to Figure 2 showing the supplemental rim assembled on the power pulley.
Figure 5:
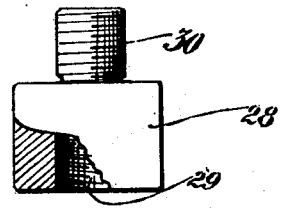
Figure 5 is a detailed view of one of the supplementary spacing members.
Figure 6:
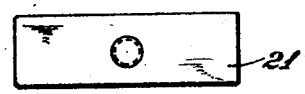
Figure 6 is a top plan view of one of the clamping members.

It will, therefore, be seen that, as is more clearly shown in Figure 4 of the drawing, I may use one, two, or more, supplementary spacing members with each clamping member, and then attach the clamping member, with or without its additional spacing member or members, to any particular supplemental rim to increase the effective diameter of the main pulley by any desired amount. For this purpose it is preferred that the effective distance between the outer periphery of the main rim and the outer periphery of the supplementary rim when the same are assembled together without the use of the supplementary spacing member shall be exactly one inch, thus increasing the effective diameter of the pulley or wheel exactly two inches. Each of the cup-shaped portions 28 of each of the supplementary spacing members 27 should be a height of exactly one inch so that by the use of one set of such supplementary spacing members, the effective diameter of the pulley will be further increased exactly two inches, and will be increased exactly four inches where two sets of supplementary members are used. etc.

In assembling the supplementary rim on the pulley, the binding members, with or without the desired number of supplementary spacing members already screwed on tightly in place, are screwed on to the corresponding retaining members of a supplemental rim of such girth that when properly tensioned on the main rim, it will increase the effective diameter of the main rim the desired number of inches. Thereafter, the supplemental rim is slipped over the main rim and the tensioning member 18 operated to bring the binding members of the supplemental rim into frictional binding contact with the main rim.

It will be noted that, as a result of the above construction, I have provided an extremely simple form of supplemental rim which is economical to manufacture, which avoids as far as possible the duplication of parts, since the binding members and the supplementary spacing members are interchangeable and may be used for any size of supplemental rim, and which is very convenient to attach or remove, as desired. Moreover, since all of the parts of the supplemental rim are contained within the outer margins of the main and supplemental rims, there is very little danger of accident, and the factory hazards are minimized as far as possible.

It will be noted that the supplemental rim is held in place on the main rim by the action of the friction of the clamping members. It will be further noted that, by means of the tensioning means provided, I have provided means whereby the supplemental rim may be adjustably tightened to meet varying conditions of use. It will also be noted that the structure is very cheap to manufacture, and thus a manufacturer may provide himself with the necessary number of supplemental rims and their replacement parts at a minimum expense, while assuring the proper operation of the supplemental rims when in use.

What I claim is:
1. A supplemental rim for power pulleys and the like, comprising a split ring-shaped member, means adjacent the split in said ring-shaped member for tensioning the same, and independently removable spacing means disposed on the inner periphery of said ring-shaped member.

2. A supplemental rim for power pulleys and the like, comprising a ring-shaped member, means for tensioning said ring-shaped member, and a plurality of independently removable spacing members disposed along the inner periphery of said ring-shaped member.

3. A supplemental rim for power pulleys and the like, comprising a ring-shaped member, means for tensioning said ring-shaped member, and a plurality of spacing members disposed along the inner periphery of said ring-shaped member, each of said spacing members comprising a retaining element attached to said ring-shaped member and a binding element removably attached to said retaining element, each pair of retaining and binding elements comprising a compound spacing member.

4. A supplemental rim for power pulleys and the like, comprising a ring-shaped member, means for tensioning said ring-shaped member, and independently removable spacing and binding means disposed along the inner periphery of said ring-shaped member.

5. A supplemental rim for power pulleys and the like, comprising a ring-shaped member, means for tensioning said ring-shaped member, and spacing and binding means disposed along the inner periphery of said ring-shaped member, each of said spacing and binding members comprising a retaining element attached to said ring-shaped member, a binding element, and one or more supplementary spacing elements interposed between said retaining element and said clamping element.

6. A supplemental rim for power pulleys and the like, comprising a split ring-shaped member, means for tensioning said ring-shaped member, and a plurality of removable and adjustable spacing and binding members disposed along the inner periphery of said ring shaped members.

7. Spacing means for supplemental rims for power pulleys and the like, comprising a binding member provided with a stud adjacent the central portion thereof.

8. Spacing means for supplemental rims for power pulleys and the like, comprising a bridge-shaped binding member provided with a threaded stud adjacent the central portion thereof.

9. Spacing and binding means for supplemental rims for power pulleys and the like, comprising a retaining member apertured adjacent the central portion thereof, and a binding member provided with a stud adjacent the central portion thereof for cooperation with the aperture of the retaining member 10. Spacing and binding means for supplemental rims for power pulleys and the like, comprising a retaining member provided with a threaded aperture adjacent the central portion thereof, and a bridge-shaped binding member provided with a threaded stud adjacent the central portion thereof for cooperation with the threaded aperture of said retaining member.

11. In combination with a power pulley or the like, a supplemental rim therefor comprising a split ring-shaped member, spacing and binding means interposed between said power pulley or the like and said supplemental rim, and means for tensioning said split ring-shaped member to bring the same into firm binding contact with said power pulley or the like.

In testimony whereof, I have signed my name to this specification this 28th day of January, 1922.

FRANK P. KOBERT.